United States Patent
Sheridan

(10) Patent No.: US 10,738,646 B2
(45) Date of Patent: Aug. 11, 2020

(54) GEARED TURBINE ENGINE WITH GEAR DRIVING LOW PRESSURE COMPRESSOR AND FAN AT COMMON SPEED, AND FAILSAFE OVERSPEED PROTECTION AND SHEAR SECTION

(71) Applicant: United Technologies Corporation, Farmington, CT (US)

(72) Inventor: William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 323 days.

(21) Appl. No.: 15/619,799

(22) Filed: Jun. 12, 2017

(65) Prior Publication Data
US 2018/0355802 A1    Dec. 13, 2018

(51) Int. Cl.
| F01D 21/04 | (2006.01) |
| --- | --- |
| F02C 7/36 | (2006.01) |
| F02C 7/06 | (2006.01) |
| F01D 25/16 | (2006.01) |
| F02K 3/06 | (2006.01) |
| F01D 21/02 | (2006.01) |
| F01D 21/00 | (2006.01) |

(52) U.S. Cl.
CPC .......... *F01D 21/045* (2013.01); *F01D 25/16* (2013.01); *F02C 7/06* (2013.01); *F02C 7/36* (2013.01); *F01D 21/006* (2013.01); *F01D 21/02* (2013.01); *F02K 3/06* (2013.01); *F05D 2260/311* (2013.01); *F05D 2260/40311* (2013.01)

(58) Field of Classification Search
CPC . F01D 5/026; F01D 5/06; F01D 5/063; F01D 5/066; F01D 25/16; F02C 7/06; F02C 7/36; F05D 2240/60; F05D 2260/311; F05D 2250/36
See application file for complete search history.

(56) References Cited

U.S. PATENT DOCUMENTS

| 4,380,896 A | 4/1983 | Wiebe |
| --- | --- | --- |
| 4,512,159 A | 4/1985 | Memmen |
| 5,291,732 A | 3/1994 | Halila |
| 6,240,719 B1 | 6/2001 | Vondrell et al. |
| 6,397,603 B1 | 6/2002 | Edmondson et al. |

(Continued)

OTHER PUBLICATIONS

European Search Report for EP Application No. 18176983.7 dated Oct. 23, 2018.

*Primary Examiner* — Andrew H Nguyen
*Assistant Examiner* — Stephanie Cheng
(74) *Attorney, Agent, or Firm* — Carlson, Gaskey & Olds, P.C.

(57) ABSTRACT

A turbine engine has a fan and a low pressure compressor that rotate at a common speed and in a common direction. A fan drive turbine drives a gear reduction to, in turn, drive the low pressure compressor and the fan at a speed which is slower than a speed of the fan drive turbine. A combustor intermediate the low pressure compressor and the fan drive turbine and a thrust bearing mount the fan drive turbine, the thrust bearing being aft of a location of the combustor. A shear section in a drive connection connecting the fan drive turbine to the gear reduction is weaker than other portions of the drive connection. The shear section is aft of the thrust bearing.

14 Claims, 4 Drawing Sheets

(56) References Cited

U.S. PATENT DOCUMENTS

| | | |
|---|---|---|
| 6,428,269 B1 | 8/2002 | Boratgis et al. |
| 6,447,248 B1 | 9/2002 | Kastl et al. |
| 6,571,560 B2 | 6/2003 | Tatsumi et al. |
| 6,655,147 B2 | 12/2003 | Farmer et al. |
| 6,895,757 B2 | 5/2005 | Mitchell et al. |
| 6,895,761 B2 | 5/2005 | Mitchell et al. |
| 6,904,757 B2 | 6/2005 | Mitchell et al. |
| 6,931,855 B2 | 8/2005 | Glessner et al. |
| 7,237,389 B2 | 7/2007 | Ryan et al. |
| 7,318,685 B2 | 1/2008 | Bouchy et al. |
| 7,546,743 B2 | 6/2009 | Bulman et al. |
| 7,603,844 B2 | 10/2009 | Moniz et al. |
| 7,841,165 B2 | 11/2010 | Orlando et al. |
| 7,934,367 B2 * | 5/2011 | Mons .................. F01D 21/003 60/39.091 |
| 8,141,370 B2 | 3/2012 | Bulman et al. |
| 8,215,115 B2 | 7/2012 | Adair et al. |
| 8,266,886 B2 | 9/2012 | McCune et al. |
| 8,621,871 B2 | 1/2014 | McCune et al. |
| 9,017,010 B2 | 4/2015 | Otto |
| 2002/0108378 A1 | 8/2002 | Ariyoshi et al. |
| 2003/0143063 A1 | 7/2003 | Coxhead et al. |
| 2004/0261419 A1 | 12/2004 | McCaffrey et al. |
| 2005/0086945 A1 | 4/2005 | Tiemann |
| 2010/0257864 A1 | 10/2010 | Prociw et al. |
| 2012/0328366 A1 | 12/2012 | Jarmon et al. |
| 2013/0152591 A1 | 6/2013 | Dery |
| 2013/0186058 A1 | 7/2013 | Sheridan et al. |
| 2014/0227084 A1 * | 8/2014 | Sheridan .................. F02C 7/36 415/122.1 |
| 2016/0025003 A1 * | 1/2016 | Schwarz .................. F01D 25/16 415/69 |
| 2016/0053689 A1 | 2/2016 | Morton |
| 2016/0376984 A1 | 12/2016 | Sheridan |
| 2017/0096941 A1 | 4/2017 | Antelo et al. |
| 2017/0175753 A1 * | 6/2017 | Tan-Kim ............... F04D 29/054 |

* cited by examiner

GEARED TURBINE ENGINE WITH GEAR DRIVING LOW PRESSURE COMPRESSOR AND FAN AT COMMON SPEED, AND FAILSAFE OVERSPEED PROTECTION AND SHEAR SECTION

BACKGROUND OF THE INVENTION

This application relates to safety features for a low pressure turbine in a geared turbofan.

Gas turbine engines are known and typically include a fan delivering air into a bypass duct as propulsion air and into a compressor as core airflow. The air is compressed in the compressor and delivered into a combustor where it is mixed with fuel and ignited. Products of this combustion pass downstream over turbine rotors driving them to rotate.

Historically, a fan drive turbine rotated at a single speed with the fan. However, there were limitations on the design and operation due to this restriction. Thus, it has been proposed to incorporate a gear reduction between the fan and the fan drive turbine. The assignee of this application has recently developed production gas turbine engines which incorporate such a gear reduction.

It has also been proposed to incorporate the gear reduction between the fan drive turbine and a low pressure compressor that is also driven by the fan drive turbine. With such an engine, challenges are raised should the shaft from the fan drive turbine fail. There is no longer a compressor slowing speed of rotation of the fan drive turbine once the shaft has failed.

SUMMARY OF THE INVENTION

In a featured embodiment, a turbine engine has a fan and a low pressure compressor that rotate at a common speed and in a common direction. A fan drive turbine drives a gear reduction to, in turn, drive the low pressure compressor and the fan at a speed which is slower than a speed of the fan drive turbine. A combustor intermediate the low pressure compressor and the fan drive turbine and a thrust bearing mount the fan drive turbine, the thrust bearing being aft of a location of the combustor. A shear section in a drive connection connecting the fan drive turbine to the gear reduction is weaker than other portions of the drive connection. The shear section is aft of the thrust bearing.

In another embodiment according to the previous embodiment, there is a high pressure turbine and a high pressure compressor and the shear section is aft of the blades on high pressure turbine.

In another embodiment according to any of the previous embodiments, the gear reduction is supported on a bearing forward of the gear reduction and on a second bearing which is aft of the gear reduction.

In another embodiment according to any of the previous embodiments, the shear section is between 1.5 and 2.0 times weaker than any other shaft section between the fan drive turbine and the gear reduction.

In another embodiment according to any of the previous embodiments, the shear section is between 1.15 and 1.5 times weaker than any other shaft section between the fan drive turbine and the gear reduction.

In another embodiment according to any of the previous embodiments, the shear section is between 1.5 and 2.0 times weaker than any other shaft section between the fan drive turbine and the gear system.

In another embodiment according to any of the previous embodiments, the shear section is between 1.15 and 1.5 times weaker than any other shaft section between the fan drive turbine and the gear reduction.

In another embodiment according to any of the previous embodiments, the shear section is provided by connections connecting a shaft section extending toward the gear reduction to a hub of the fan drive turbine.

In another embodiment according to any of the previous embodiments, the connections are one of bolts and pins.

In another embodiment according to any of the previous embodiments, the shear section is provided by a thin portion.

In another embodiment according to any of the previous embodiments, the thin portion is in a hub connecting the fan drive turbine to a shaft.

In another embodiment according to any of the previous embodiments, the fan drive turbine is supported on the thrust bearing and on a second bearing which is aft of the thrust bearing.

In another embodiment according to any of the previous embodiments, the gear reduction is an epicyclic gear reduction.

In another featured embodiment, a gas turbine engine has a fan and low pressure compressor that rotate at a common speed and in a common direction. A fan drive turbine drives an epicyclic gear reduction to, in turn, drive the low pressure compressor and the fan at a speed which is slower than a speed of the fan drive turbine. A combustor intermediate the low pressure compressor and the fan drive turbine and a thrust bearing mount the fan drive turbine. The thrust bearing is aft of a location of the combustor. A shear section in a drive connection connecting the fan drive turbine to the gear reduction is weaker than other portions of the drive connection, and the shear section being aft of the thrust bearing. The gear reduction is supported on a bearing forward of the gear reduction and on a second bearing which is aft of the gear reduction.

In another embodiment according to any of the previous embodiments, there is a high pressure turbine and a high pressure compressor and the shear section is aft of blades on the high pressure turbine.

In another embodiment according to any of the previous embodiments, the shear section is between 1.5 and 2.0 times weaker than any other shaft section between the fan drive turbine and the gear reduction.

In another embodiment according to any of the previous embodiments, the shear section is between 1.15 and 1.5 times weaker than any other shaft section between the fan drive turbine and the gear reduction.

In another embodiment according to any of the previous embodiments, the shear section is provided by connections connecting a shaft section extending toward the gear reduction to a hub of the fan drive turbine.

In another embodiment according to any of the previous embodiments, the shear section is provided by a thin portion.

In another embodiment according to any of the previous embodiments, the thin portion is in a hub connecting the fan drive turbine to a shaft.

These and other features may be best understood from the following drawings and specification.

DETAILED DESCRIPTION

Figure 1:
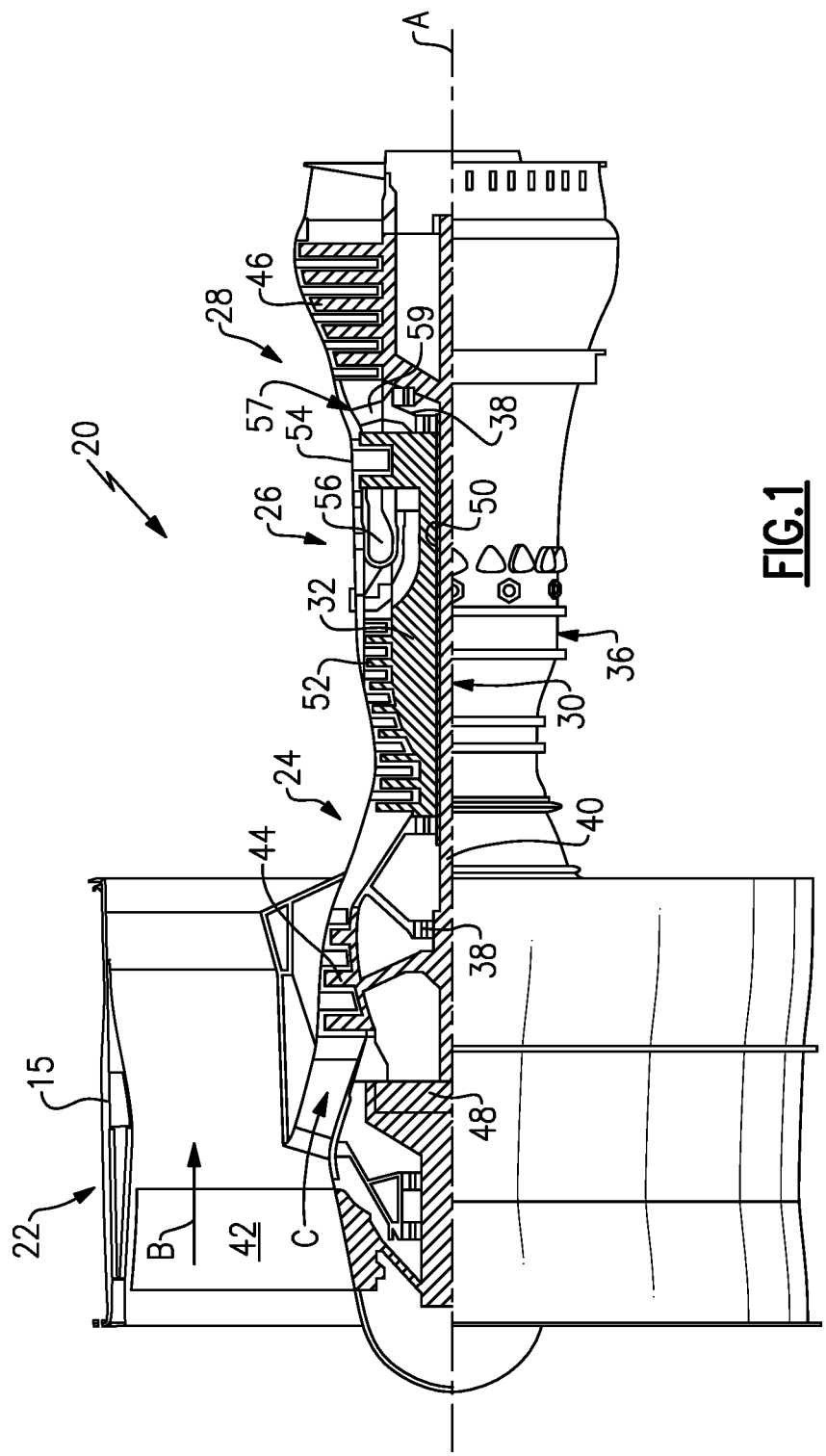
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), and less than thirty (30), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1 and less than 15:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than 6.0. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
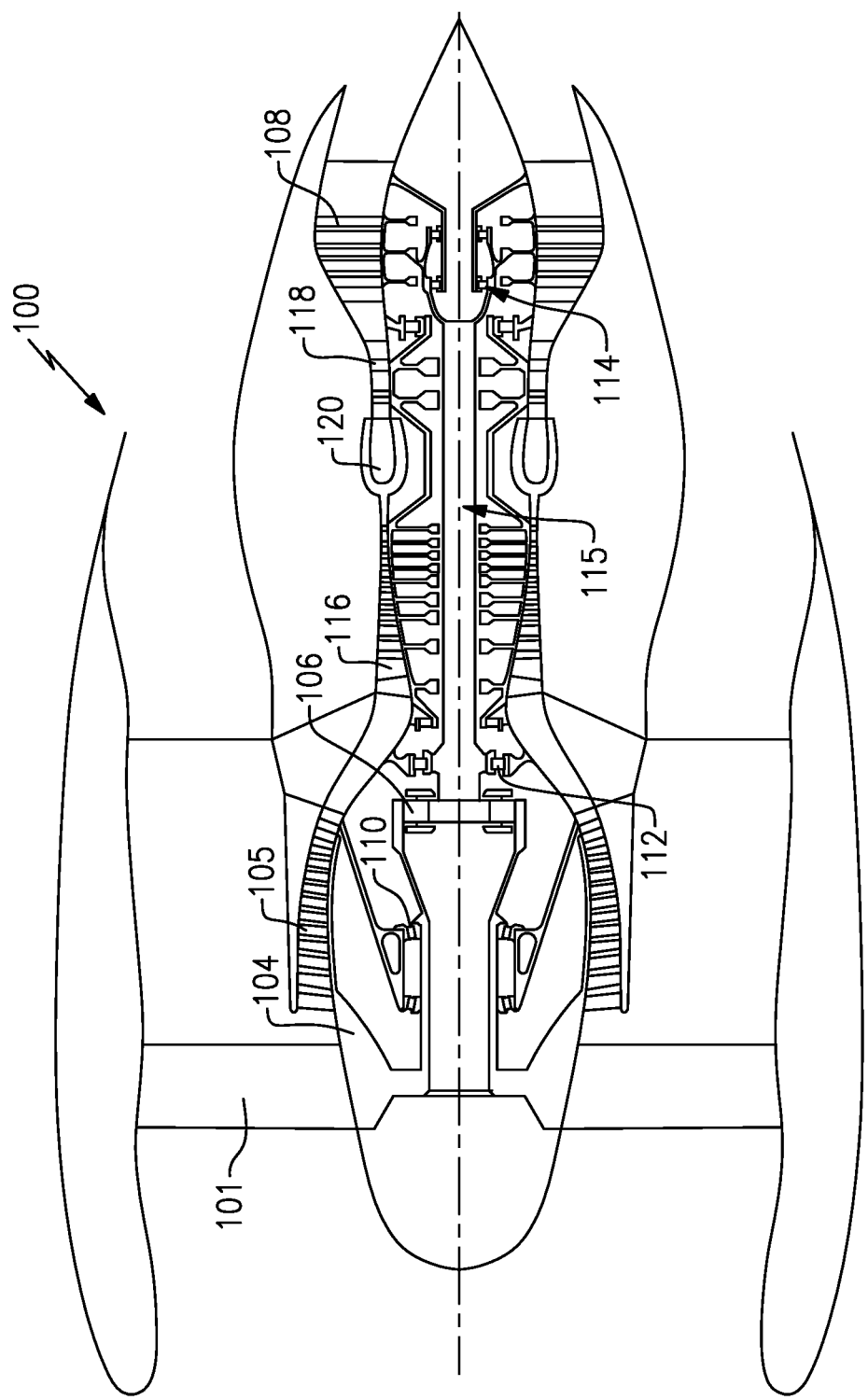
FIG. 2 shows a second embodiment gas turbine engine.

While the quantities discussed above relate to a compressor in which the gear reduction is intermediate to the low pressure turbine and the fan rotor, many of these quantities might apply to an engine, such as engine 100 illustrated in FIG. 2, wherein the gear reduction 106 is intermediate to the fan drive turbine 108 and a low pressure compressor rotor 104, which is driven to rotate at the same speed and in the same direction as a fan rotor 101. The speed of the compressor rotor 104 and fan rotor 101 will be slower than the speed of turbine 108.

As known, the low pressure compressor 104 includes blades 105. The gear reduction 106 is illustrated somewhat schematically, but may be an epicyclic gear reduction. The gear reduction is so-called "straddle mounted" meaning there is a bearing 110 supporting it at a forward location and a second bearing 112 aft of the gear reduction. A low turbine shaft 115 connects low turbine 108 with gear reduction system 106. The low turbine shaft could be of any type of geometric shape such as solid, hollow, flexible or non-flexible, providing it transmits torque from low turbine 108 to the gear reduction 106.

The fan drive turbine 108 is provided with a thrust bearing 114. This thrust bearing is illustrated aft of a combustor 120.

In addition, it is aft of the blades on a high pressure turbine 118, which drives the high pressure compressor 116.

As mentioned above, there are challenges with such compressors should the low turbine shaft 115 driving the gear reduction 106 from the fan drive turbine 108 fracture. Thus, FIG. 3 shows features which address this concern.

Figure 3A:
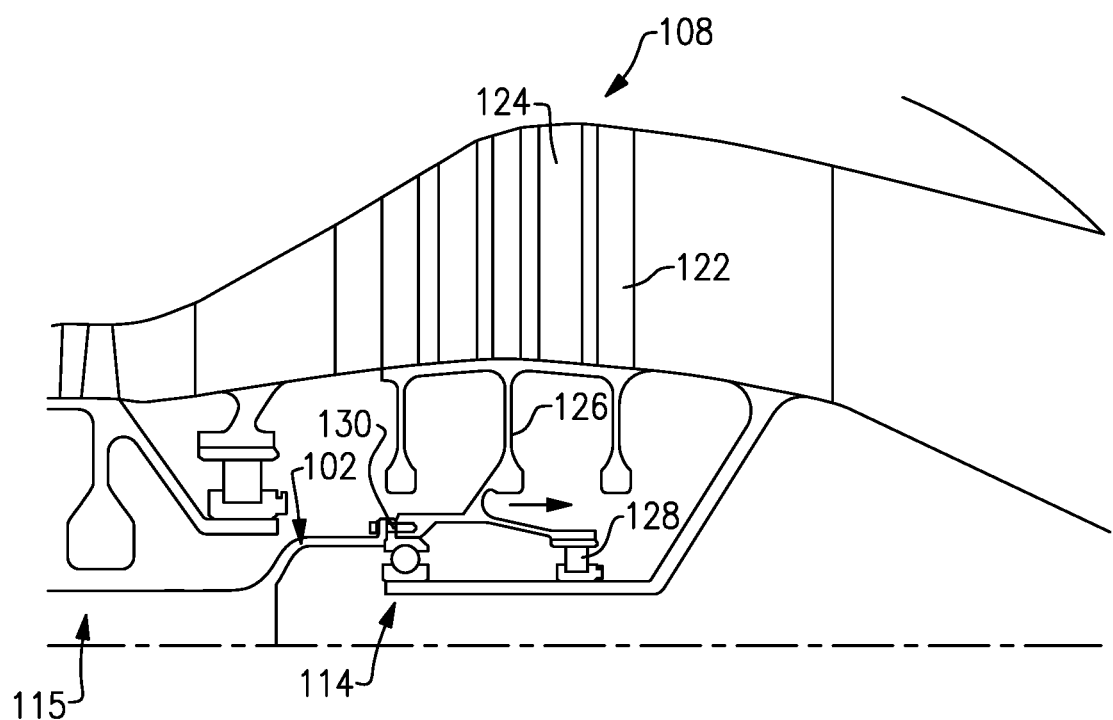
FIG. 3A shows a detail of the FIG. 2 embodiment.
Figure 3B:
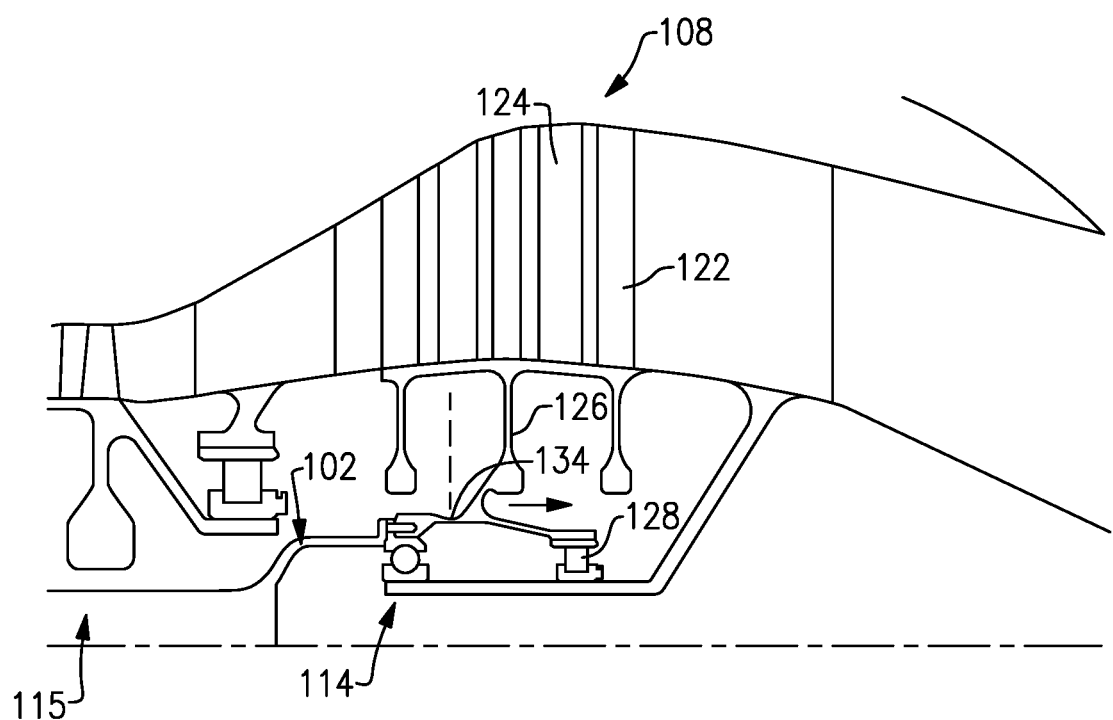
FIG. 3B shows an alternative.

As shown in FIGS. 3A and 3B, the fan drive turbine 108 includes blades 122 and intermediate static vanes 124. A hub 126 is supported on bearings 114 and 128. A shaft portion 102 extends forward of the hub 126. The hub is shown pinned at 130 (FIG. 3A) to the shaft portion 102.

In addition, a weakened portion 134 (FIG. 3A) may be provided aft of the thrust bearing 114.

It should be understood that the shaft will tend to fail at either the pins 130 or the weakened portion 134 and aft of the thrust bearing 114. The pins 130 or weakened section 134 will always be the weakest section of low turbine shaft 115. In the event of excessive torsional overload or other emergency high load condition, pins 130 or weakened section 134 will easily fracture before any other portion of low turbine shaft 115 fails. Section 134 is aft of thrust bearing 114. Since the fracture will occur aft of the thrust bearing 114, the turbine rotor will move rearward and blades 122 will contact the vanes 124 and rotation will be resisted, if not prevented. Thus, the overspeed concern mentioned above will be addressed.

In embodiments, the shear section, be it the weakened portion 134 or the pin connections 130, are between 1.5 and 2.0 times weaker than any other shaft section between the fan drive turbine 108 and the gear reduction 106.

In an alternative embodiment, the shear section is between 1.15 and 1.5 times weaker than any shaft section between the fan drive turbine 108 and the gear reduction 106.

As shown, the shear section can be an array of bolts or pins 130, or alternatively is the thin portion 134.

While the drive input for the gear reduction 106 is not specifically illustrated, it may be a flexible connection or it may be a more rigid connection. In addition, while the gear reduction 106 is disclosed as being epicyclic, this disclosure may extend to non-epicyclic gear reductions.

The thrust bearings as disclosed and claimed may be any type thrust bearing, including ball bearings, tapered roller bearings and spherical roller bearings, among others.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan and a low pressure compressor, said fan and said low pressure compressor configured for rotating at a common speed and in a common direction;
a fan drive turbine configured for driving a gear reduction, in turn configured for driving said low pressure compressor and said fan at said common speed which is slower than a turbine speed of said fan drive turbine;
a combustor intermediate said low pressure compressor and said fan drive turbine and a thrust bearing configured for mounting said fan drive turbine, said thrust bearing being aft of a location of said combustor; and
a shear section in a drive connection configured for connecting said fan drive turbine to said gear reduction that is weaker than other portions of said drive connection, and said shear section being aft of at least a portion of said thrust bearing; and
wherein said shear section is between 1.5 and 2.0 times weaker than any other section of said drive connection between said fan drive turbine and said gear reduction.

2. The gas turbine engine as set forth in claim 1, wherein there is a high pressure turbine and a high pressure compressor and said shear section is aft of blades on said high pressure turbine.

3. The gas turbine engine as set forth in claim 1, wherein said gear reduction is configured to be supported on a bearing forward of said gear reduction and on a second bearing which is aft of said gear reduction.

4. A gas turbine engine comprising:
a fan and a low pressure compressor, said fan and said low pressure compressor configured for rotating at a common speed and in a common direction;
a fan drive turbine configured for driving a gear reduction, in turn configured for driving said low pressure compressor and said fan at said common speed which is slower than a turbine speed of said fan drive turbine;
a combustor intermediate said low pressure compressor and said fan drive turbine and a thrust bearing configured for mounting said fan drive turbine, said thrust bearing being aft of a location of said combustor;
a shear section in a drive connection configured for connecting said fan drive turbine to said gear reduction that is weaker than other portions of said drive connection, and said shear section being positioned such that upon fracture, said fan drive turbine will move in an aft direction away from said thrust bearing;
wherein said shear section is provided by connections configured for connecting a shaft section to a hub of said fan drive turbine, said shaft section extending to be connected to said gear reduction; and
wherein said connections are one of bolts and pins.

5. The gas turbine engine as set forth in claim 4, wherein said shear section is between 1.15 and 1.5 times weaker than any other section of said shaft between said fan drive turbine and said gear reduction.

6. The gas turbine engine as set forth in claim 1, wherein said shear section is provided by a thin portion.

7. The gas turbine engine as set forth in claim 6, wherein said thin portion is in a hub configured for connecting said fan drive turbine to a shaft in said drive connection.

8. The gas turbine engine as set forth in claim 7, wherein said shear section is between 1.15 and 1.5 times weaker than any other section of said shaft between said fan drive turbine and said gear reduction.

9. The gas turbine engine as set forth in claim 1, wherein said fan drive turbine is configured to be supported on said thrust bearing and on a second bearing which is aft of said thrust bearing.

10. The gas turbine engine as set forth in claim 1, wherein said gear reduction is an epicyclic gear reduction.

11. A gas turbine engine comprising:
a fan and a low pressure compressor, said fan and said low pressure compressor configured for rotating at a common speed and in a common direction;
a fan drive turbine configured for driving an epicyclic gear reduction, in turn, configured for driving said low pressure compressor and said fan at said common speed which is slower than a turbine speed of said fan drive turbine;
a combustor intermediate said low pressure compressor and said fan drive turbine and a thrust bearing configured for mounting said fan drive turbine, said thrust bearing being aft of a location of said combustor;

a shear section in a drive connection configured for connecting said fan drive turbine to said gear reduction that is weaker than other portions of said drive connection, and said shear section being aft of at least a portion of said thrust bearing;

said gear reduction configured to be supported on a bearing forward of said gear reduction and on a second bearing which is aft of said gear reduction; and wherein said shear section is between 1.5 and 2.0 times weaker than any other section of said drive connection between said fan drive turbine and said gear reduction.

12. The gas turbine engine as set forth in claim 11, wherein there is a high pressure turbine and a high pressure compressor and said shear section is aft of blades on said high pressure turbine.

13. The gas turbine engine as set forth in claim 11, wherein said shear section is provided by a thin portion.

14. The gas turbine engine as set forth in claim 13, wherein said thin portion is in a hub configured for connecting said fan drive turbine to a shaft in said drive connection.

* * * * *